(12) United States Patent
Furuhashi et al.

(10) Patent No.: US 7,206,779 B2
(45) Date of Patent: Apr. 17, 2007

(54) METHOD AND APPARATUS FOR RETRIEVING SIMILAR OBJECTS

(75) Inventors: Yukihito Furuhashi, Hachioji (JP); Hiroshi Matsuzaki, Hachioji (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 760 days.

(21) Appl. No.: 10/172,322

(22) Filed: Jun. 14, 2002

(65) Prior Publication Data

US 2002/0191016 A1    Dec. 19, 2002

(30) Foreign Application Priority Data

Jun. 15, 2001    (JP) ............... 2001-182045

(51) Int. Cl.
  *G06F 17/30*    (2006.01)
(52) U.S. Cl. ............... 707/5; 707/3; 707/10; 707/104.1
(58) Field of Classification Search ............... 707/1–10, 707/100–104.1
  See application file for complete search history.

(56) References Cited

U.S. PATENT DOCUMENTS 6,240,423 B1 * 5/2001 Hirata ............... 707/104.1

6,574,616 B1 * 6/2003 Saghir ............... 707/1

FOREIGN PATENT DOCUMENTS

JP    9-101970    4/1997
JP    2000-285141    10/2000

* cited by examiner

*Primary Examiner*—Mohammad Ali
*Assistant Examiner*—Sangwoo Ahn
(74) *Attorney, Agent, or Firm*—Scully, Scott, Murphy & Presser PC (57) ABSTRACT

An object retrieval method used is characterized as follows. When a user selects objects, the dispersion between the objects is found with respect to each of a plurality of feature quantities. Within a retrieval range of objects, the dispersion between the objects is found with respect to each of a plurality of feature quantities. Both dispersions are compared for each feature quantity. As a result of the comparison, there may be a feature quantity which causes more converged dispersion in the selected objects. This feature quantity is provided with a weight larger than any other feature quantities to weight each feature quantity. An object is retrieved from the retrieval range based on the weighted feature quantities.

20 Claims, 8 Drawing Sheets

METHOD AND APPARATUS FOR RETRIEVING SIMILAR OBJECTS

CROSS-REFERENCE TO RELATED APPLICATIONS

This application is based upon and claims the benefit of priority from the prior Japanese Patent Application No. 2001-182045, filed Jun. 15, 2001, the entire contents of which are incorporated herein by reference.

BACKGROUND OF THE INVENTION

1. Field of the Invention

The present invention relates to a method and an apparatus for retrieving similar objects using the object's feature quantity and particularly to a method and an apparatus for retrieving similar objects using the multimedia object's feature quantity.

2. Description of the Related Art

In recent years, multimedia object data has been used in various situations. The multimedia object data includes still pictures, motion pictures, voice, and music. Concerning data for expressing a 3-D object, for example, a solid shape, there are extensively used 3-D object data for merchandise, a digital archive of 3-D object data for archaeology, art objects, etc., in addition to conventionally used CAD data. Further, a large amount of digital image data and digital music data is interchanged via the Internet. These types of data are increasing. There is an increasing demand for effectively managing data and retrieving data requested by users.

Various technologies are proposed to satisfy these demands. With respect to the technology for retrieving similar objects, there is proposed a method of calculating features of multimedia objects such as the above-mentioned images, music, etc., and performing retrieval based on feature quantities. According to the similar object retrieval method based on feature quantities, a user first specifies an object intended to be a retrieval result. The feature quantity of the specified object is compared to that of an object registered in the database. Doing so makes it possible to retrieve a similar object which resembles the object intended by the user. In this case, it is a general practice to set a weighting factor to represent importance of feature quantities (color, shape, etc. for representing the feature). Appropriately setting the weighting factor makes it possible to retrieve objects that differ in color but have similar shape. There are proposed methods of properly setting the weighting factor for effective retrieval. An example is Jpn. Pat. Appln. KOKAI Publication No. 2000-285141 titled "Image retrieval device, image classifying device, and computer readable recording medium recorded with program for functioning computer as these devices". In this publication, there is proposed an image retrieval apparatus capable of specifying the importance of various types of feature quantities attributed to an image. Using this apparatus, a user can specify the importance of various types of feature quantities attributed to an image and retrieve images based on the feature assumed to be more important.

In the Jpn. Pat. Appln. KOKAI Publication No. 9-101970 "Method and device for retrieving image", there is proposed an image retrieval method having the steps of extracting feature quantities having approximate values between a plurality of candidate images and increasing the weighting of these feature quantities. This method enables weighting of the feature quantity based on values between a plurality of candidate images selected from the database. This proposal enables images obtained as a result of the similarity retrieval to be re-selected as candidate images.

However, conventional methods make it very difficult to obtain an intended retrieval result unless a user fully understands the meaning of the feature quantity for specifying the weighting factor. According to Jpn. Pat. Appln. KOKAI Publication No. 2000-285141, for example, it is possible to specify the importance for each type of feature quantity attributed to an image. However, to obtain an intended retrieval result, the user must correctly understand the type of feature quantities corresponding to that result and specify the importance for each feature quantity. All feature quantities of objects are not always intuitive. In many cases, there is no one-to-one correspondence between an intended retrieval result and a feature quantity item. A plurality of feature quantity items is required for obtaining an intended retrieval result. Accordingly, it is very difficult and inefficient to manually specify the importance for each feature quantity for obtaining an intended retrieval result.

According to Jpn. Pat. Appln. KOKAI Publication No. 9-101970, it is possible to extract feature quantities having approximate values between a plurality of candidate images and automatically change the weighting of these feature quantities. In reality, however, feature quantities in the database must be normalized for all objects included in the retrieval range in order to determine the importance of the feature just by using the approximation of feature quantity values. A general retrieval system adjusts a retrieval range according to the object as a retrieval key and a user intention. Let us assume to retrieve a chair similar to an intended one from an interior database. In this case, the general retrieval system limits the retrieval range to a minimum including chairs, not to the entire database. Changing the retrieval range varies the statistic of objects included in the retrieval range, making it difficult to normalize feature quantities beforehand. Namely, the method of automatically weighting feature quantities in Jpn. Pat. Appln. KOKAI Publication No. 9-101970 is impractical because the method requires the database to be normalized in the current retrieval range. When an attempt is made to retrieve an object not present in the database, feature quantities including that object are not normalized. It is difficult to automatically weight feature quantities according to the technique in Jpn. Pat. Appln. KOKAI Publication No. 9-101970. Each time the retrieval range is changed, feature quantities need to be normalized in accordance with the changed retrieval range. Otherwise, it is difficult to compare feature quantities for a plurality of selected candidate images and to determine whether or not the compared values are approximate to each other. Consequently, it is impossible to provide an effect of automating the weighting of feature quantities.

BRIEF SUMMARY OF THE INVENTION

The present invention has been made in consideration of the foregoing. It is therefore an object of the present invention to provide a method and an apparatus for retrieving similar objects capable of automatically adjusting feature quantity's weighting factors and effectively retrieving an intended object.

The present invention solves the above-mentioned problems. An object retrieval method according to a first aspect of the invention comprises: a first step of selecting a plurality of objects from displayed objects; a second step of obtaining dispersion for each of the plurality of objects selected with respect to a plurality of different types of feature quantities;

a third step of obtaining dispersion for each of a plurality of objects in a range of object retrieval with respect to a plurality of different types of feature quantities; a fourth step of comparing the dispersion obtained by the second step for each of a plurality of objects with the dispersion obtained by the third step for each of a plurality of objects with respect to a plurality of different types of feature quantities; a fifth step of weighting the plurality of different types of feature quantities, wherein a larger weight is given to a feature quantity which causes more converged dispersion for each of the plurality of selected objects than dispersion for each of the plurality of objects in the range of object retrieval with respect to the compared dispersions for objects; and a sixth step of retrieving objects in the range of object retrieval through the use of the plurality of different types of weighted feature quantities.

The first step of selecting objects selects objects similar to those expected to be selected as a retrieval result.

The first step of selecting objects selects objects not similar to those expected to be selected as a retrieval result.

The first step of selecting objects selects both objects similar to those expected to be selected as a retrieval result and objects not similar to those expected to be selected as a retrieval result.

The second step further comprises the steps of: weighting each of the plurality of selected objects; finding a feature quantity for the plurality of objects with respect to each of the plurality of different types of feature quantities; and obtaining dispersion of the plurality of objects by reflecting weighting for the plurality of objects with respect to each of the plurality of different types of feature quantities.

The first step selects the plurality of objects according to priorities; and the second step weights the objects selected according to priorities.

The fourth step compares dispersions by using a dispersion value as dispersion between the plurality of objects.

The fourth step compares dispersions by using standard deviation as dispersion between the plurality of objects.

The first step selects objects a plurality of objects out of those previously registered to a database.

A database previously registers feature quantities for objects used for the second and third steps.

Figure 8:
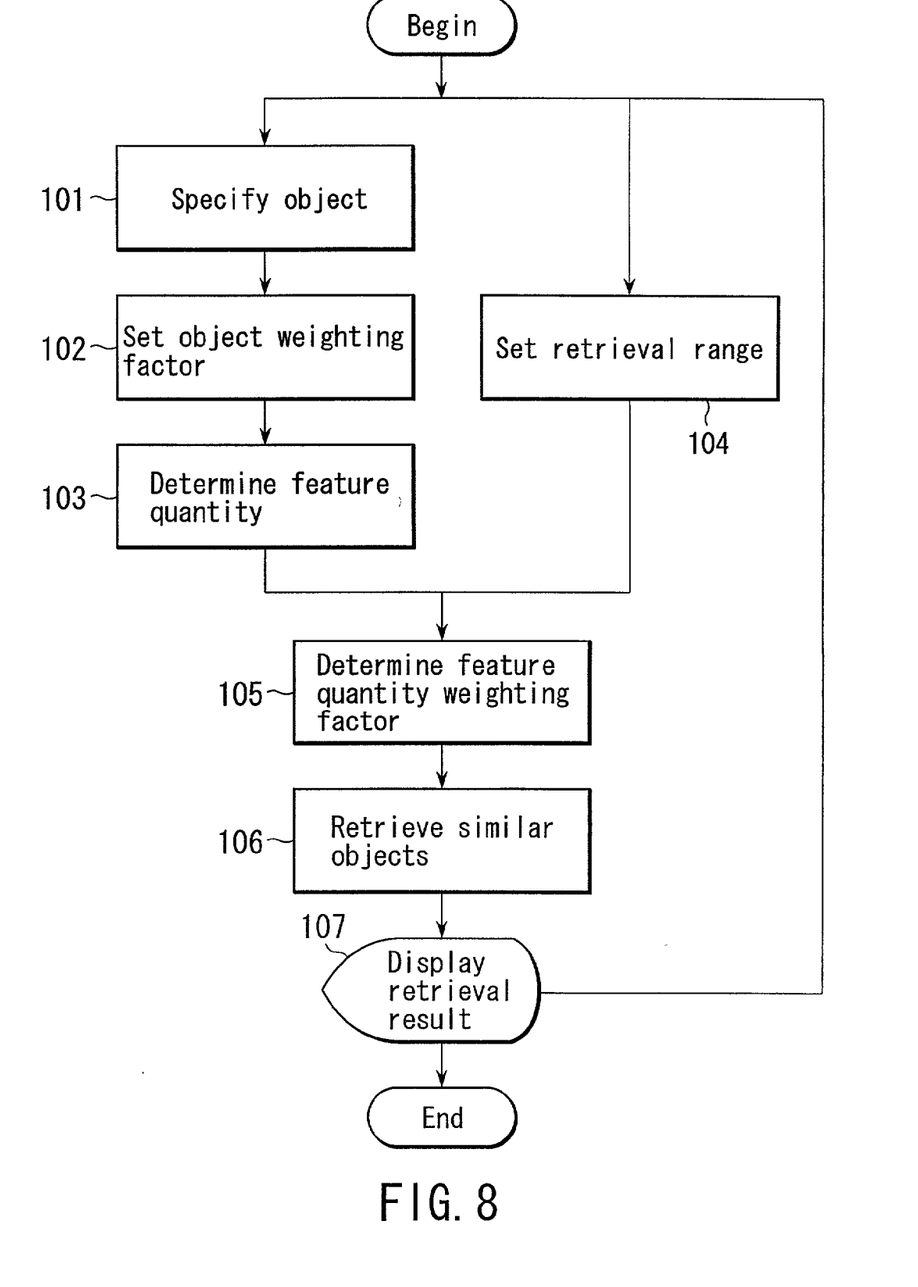
FIG. 8 is a flowchart showing an operational procedure for object retrieval according to the embodiment of the present invention.

Of constituent elements in the claims, the first process corresponds to step 101 in FIG. 8. The second and third processes correspond to steps 102, 103, 104, and 105 in FIG. 8. The fourth process corresponds to step 204 in FIG. 9. The fifth process corresponds to steps 205 and 206 in FIG. 9. The sixth process corresponds to step 106 in FIG. 8. Further, of constituent elements in the claims, the process of weighting each of the plurality of selected objects corresponds to step 102 in FIG. 8. The process of finding different types of feature quantities for the plurality of objects corresponds to step 103 in FIG. 8. The process of finding dispersion of the plurality of objects by reflecting the weighting of the plurality of objects corresponds to steps 201 and 202 in FIG. 9. Moreover, of constituent elements in the claims, the object selection apparatus corresponds to the object selection section 4 in FIG. 1. The first dispersion processing apparatus corresponds to the first distribution processing section 7a in FIG. 2. The dispersion processing apparatus corresponds to a second distribution processing section 7b in FIG. 2. The weighting apparatus corresponds to the weighting section 7c in FIG. 2. The retrieval apparatus corresponds to a retrieval section 9 in FIG. 1. The apparatus to set a weight corresponds to the weight setting section 2a in FIG. 2. The apparatus to find the object's feature quantity corresponds to the feature quantity decision section 2b in FIG. 2. The apparatus to obtain the object dispersion corresponds to the dispersion computation section 2c in FIG. 2.

As a retrieval result according to the present invention, a plurality of objects is specified as intended objects. Weighting factors are automatically set from the feature quantities for these objects to retrieve similar objects. The present invention automatically increases the weighting factor for a feature quantity common to objects intended as a retrieval result and decreases the weighting factor for a feature quantity not common to these objects. At this time, the user need not be aware of the meaning of an object's feature quantity. Accordingly, highly ranked retrieval results can include objects having similar feature quantities to which a user pays a lot of attention as intended elements. The statistic for the retrieval range is compared to the statistic for a selected group of feature quantities. It is needless to normalize all feature quantities each time the retrieval range is changed.

An object retrieval apparatus according to a second aspect of the invention comprises: an object selection apparatus which displays a plurality of objects and supplies objects to be selected from the plurality of displayed objects; a first dispersion processing apparatus which finds dispersion of the plurality of objects selected by the object selection apparatus with respect to each of plurality of different types of feature quantities; a second dispersion processing apparatus which finds dispersion of the plurality of objects in the range of object retrieval with respect to each of plurality of different types of feature quantities; a dispersion comparison apparatus which compares dispersion of a plurality of different types of feature quantities found by the first dispersion processing apparatus with dispersion of a plurality of different types of feature quantities found by the second dispersion processing apparatus; a weighting apparatus which weights feature quantities wherein when the dispersion of selected objects is determined to be more converged than the dispersion of objects in the range of object retrieval based on dispersions compared by the dispersion comparison apparatus, the dispersion of selected objects is provided with a weight larger than any other feature quantities' weights; a retrieval apparatus which retrieves objects in the range of object retrieval by using feature quantities weighted by the weighting apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described in detail with reference to the accompanying drawings.

Figure 1:
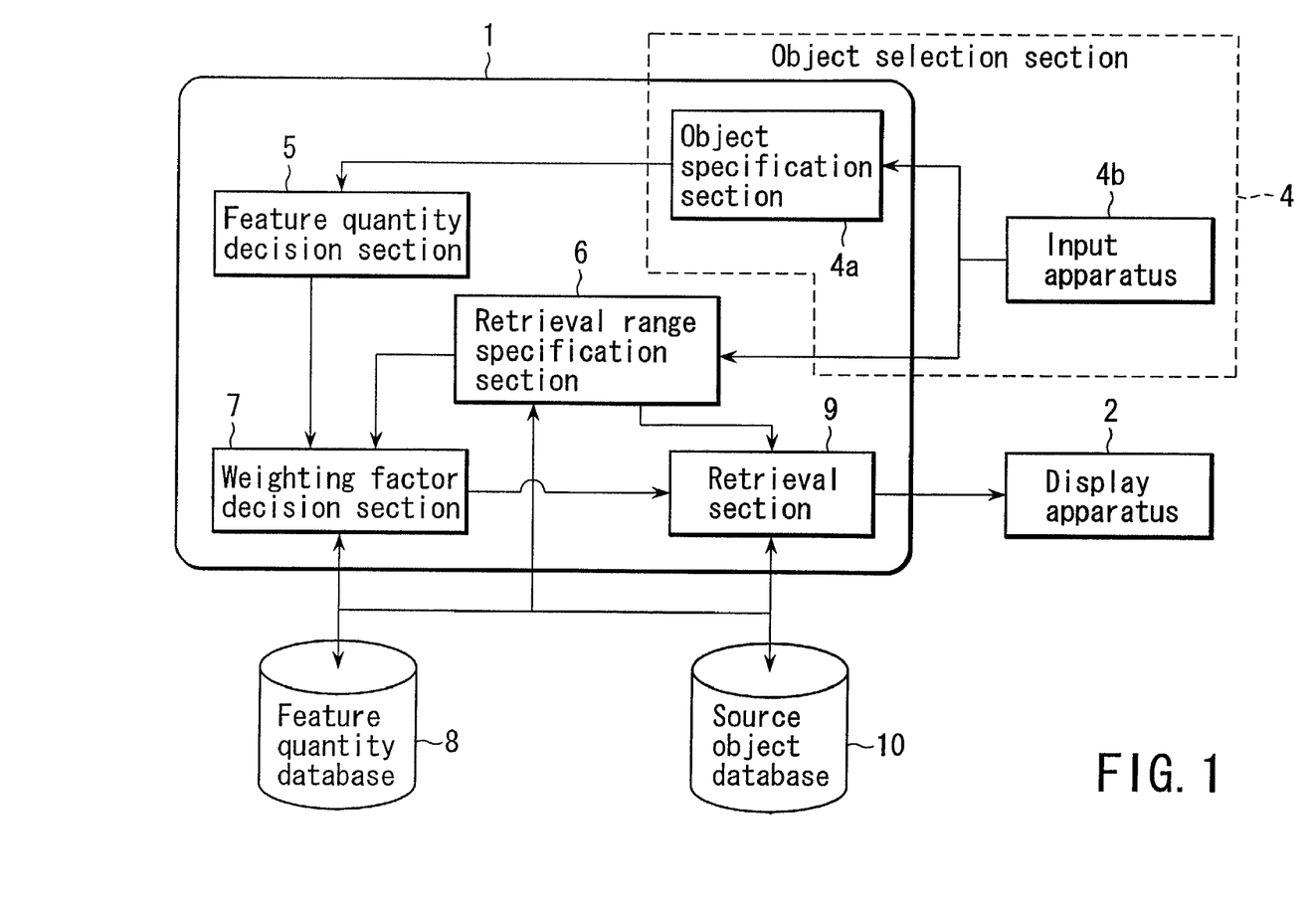
FIG. 1 is a schematic diagram showing a configuration according to an embodiment of the present inventions.

FIG. 1 is a schematic diagram showing a configuration according to the present inventions. A processing apparatus 1 connects with a display apparatus 2 and an input apparatus 4b. The display apparatus 2 comprises a CRT, an LCD display, a 3-D display apparatus, etc. for displaying object data. The input apparatus 4b comprises a keyboard, a mouse, and a tablet for entering data or voice. Object data supplied from the input apparatus 4b is input to an object specification section 4a and a retrieval range specification section 6 in the processing apparatus 1. A feature quantity decision section 5 determines a feature quantity of the object input to the object specification section 4a. The determined feature quantity is input to a weighting factor decision section 7. The input apparatus 4b for supplying object data and the object specification section 4a for specifying objects are generically referred to as an object selection section 4.

Figure 2:
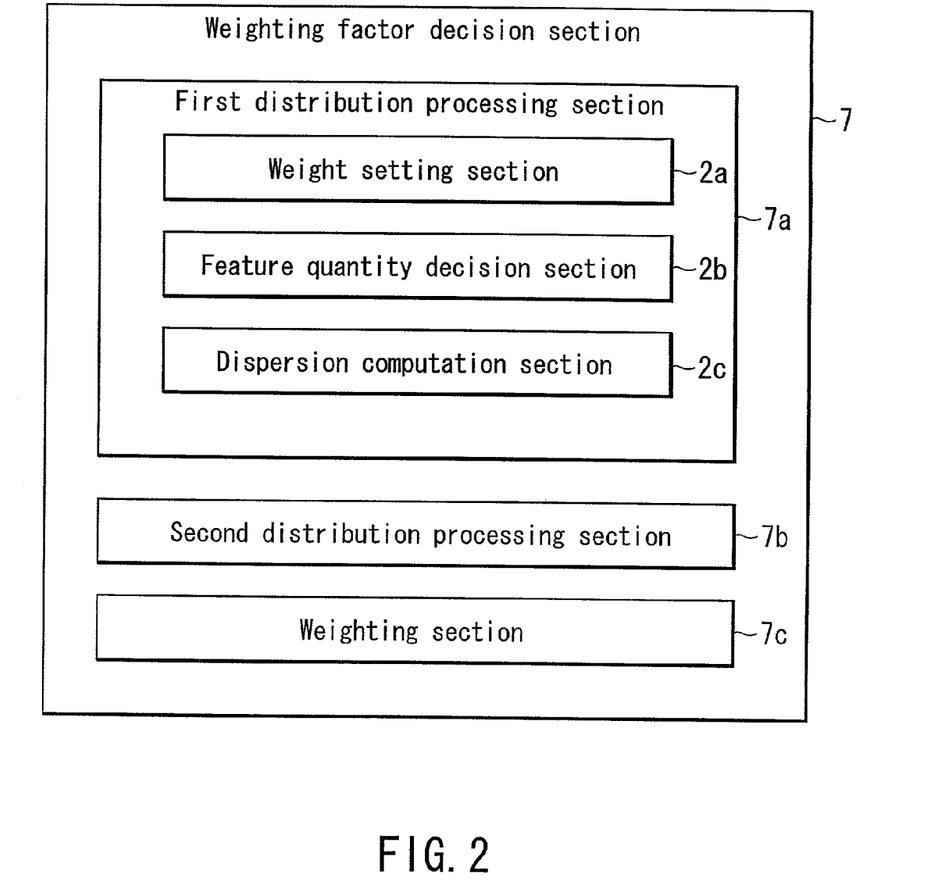
FIG. 2 is a block diagram showing a configuration of a weighting factor decision section.

When supplied with object data, the retrieval range specification section 6 specifies a range for retrieving the input object data. The object data is sent to the weighting factor decision section 7 and a retrieval section 9. As shown in FIG. 2, the weighting factor decision section 7 comprises a first distribution processing section 7a, a second distribution processing section 7b, and a weighting section 7c. Further, the first distribution processing section 7a comprises a weight setting section 2a, a feature quantity decision section 2b, and a dispersion computation section 2c.

When object data is input to the weighting factor decision section 7, the first distribution processing section 7a finds dispersion of the plurality of objects with respect to various types of feature quantities such as colors and shapes. These objects are selected in the object specification section 4a of the object selection section 4. In the first distribution processing section 7a, the weight setting section 2a sets a weighting factor as feature quantity importance. The feature quantity decision section 2b determines a feature quantity. The dispersion computation section 2c computes a dispersion value.

When object data is input to the weighting factor decision section 7, the second distribution processing section 7b computes dispersion values for a user-specified range of objects to be retrieved with respect to different types of feature quantities.

The weighting section 7c determines a weighting factor for the computed dispersion values which are then stored in a feature quantity database 8 (see FIG. 1).

The retrieval section 9 is supplied with information about the retrieval range from the retrieval range specification section 6. According to the retrieval range, the retrieval section 9 compares and retrieves two types of feature quantities. One type relates to the input object data provided with the weighting factor determined by the weighting factor decision section 7. The other type relates to the object data stored in the feature quantity database 8. Based on the retrieved feature quantities, the source object data as original data is read from the source object database and is used as a retrieval result.

As mentioned above, the feature quantity database 8 stores feature quantities of multimedia objects stored in the source object database 10. As the feature quantities, there are used a histogram generated by quantizing values for each color information such as RGB, HSV, Lab, etc., computed for the 3-D object texture, a shape histogram generated by quantizing the edge differentiation, a 3-D object's volume, surface area, etc. available as 3-D object's shape features. Further, it is possible to define and use any feature quantity if it can be handled as a 3-D object feature. These feature quantities may be discretionarily extracted from various parts and used as independent feature quantities.

FIGS. 3 through 7 show embodiments of 3-D objects displayed on a screen of the display apparatus 2. The screen can display a window 11 (see FIG. 3) for a user to specify an object to be intended as a retrieval result, a window 12 (see FIG. 4) for a user to specify an object unintended as a retrieval result, a window 13 (see FIG. 5) for a user to specify a retrieval range, a window 14 (see FIG. 6) to display a retrieval result, and a window 15 (see FIG. 7) to display objects registered in a database.

Figure 7:
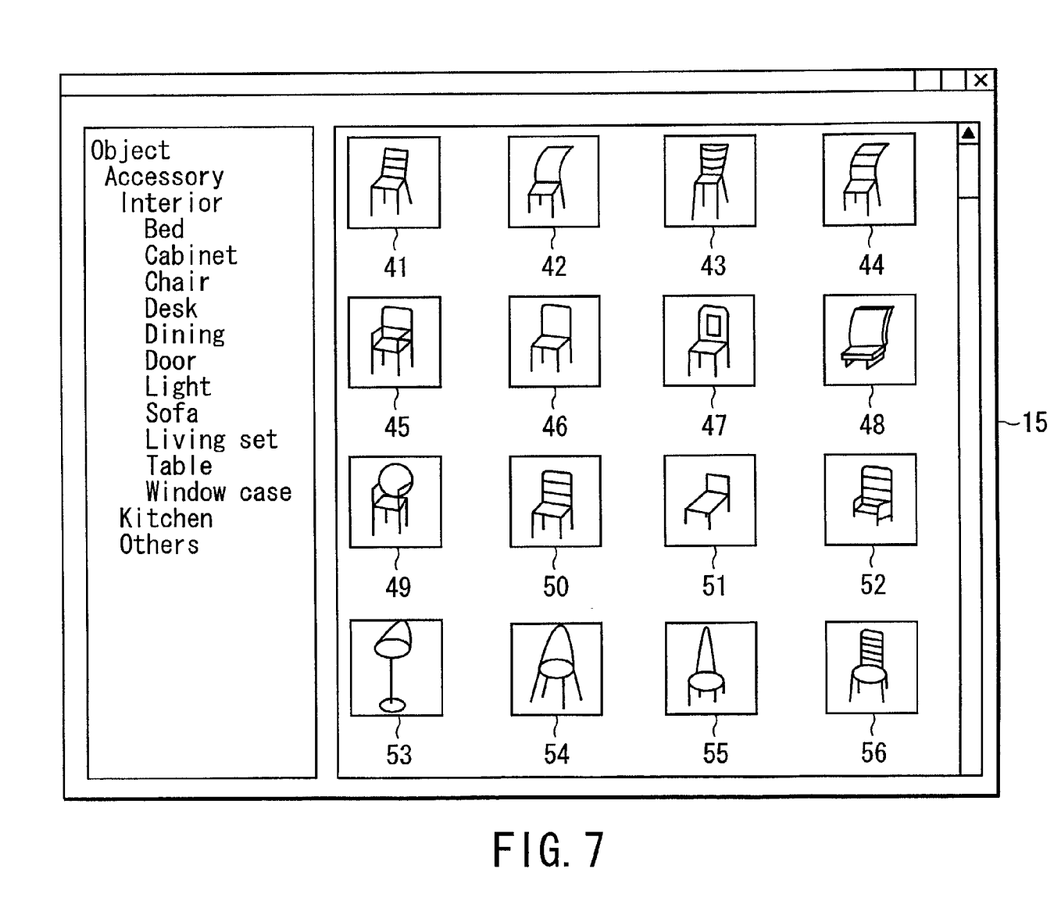
FIG. 7 shows a screen displaying a list of genre names registered to a source object database and objects corresponding to the list.

The window 11 displays various intended 3-D objects 20 through 24 which the user intends to be retrieval results. The window 12 displays various unintended 3-D objects 26 through 28 a user does not intend to be retrieval results. The window 13 displays a retrieval range of objects to be retrieved. For example, checking an interior check box 4a also enables check boxes for bed, cabinet, etc. belonging to the interior tree. The check boxes can be disabled individually. The window 14 displays various retrieved 3-D objects 30 through 32 as a retrieval result. The window 15 displays 3-D objects 41 through 56 which are registered to the source object database. A frame to the left of the window 15 contains a list of 3-D objects. FIG. 7 shows the chair is selected from the interior. Since the chair is selected from the list, the right window shows 3-D objects 41 through 56 equivalent to the chair. The method of registration to these windows will be described later.

FIG. 8 shows a sequence of object retrieval operations. At step 101, the object specification section 4 specifies objects on the windows 11 and 12 according to the user's instructions. The window 11 displays objects intended to be a retrieval result. The window 12 displays objects not intended to be a retrieval result. The user's instruction signifies, for example, registering an object to the corresponding window by means of drag-and-drop.

Objects registered to the windows 11 and 12 are displayed on the window 15. Further, the application's open menu is used to select an object that is available on the apparatus according to the present invention.

At step 102, an object weighting factor is specified for each of objects registered to the windows 11 and 12 by the user. The object weighting factor is a parameter representing importance of the object. As a method of setting weighting factors, the user can specify an appropriate object weighting factor. Alternatively, the object specification section 4 automatically sets an object weighting factor according to the order of objects in the windows 11 and 12. The user can choose from these methods discretionarily. For example, the object specification section 4 automatically determines weighting factors for the objects 20 through 24 displayed in the window 11 in FIG. 3. The objects 20 through 24 are sequenced as 1, 2, 3, 4, and 5 as they are displayed in the window. Corresponding to this sequence, values 1, ½, ⅓, ¼, and ⅕ are defined as object weighting factors wo20, wo21, wo22, wo23, and wo24.

The objects' weighting factors are not limited to the above-mentioned values but can be given any ratios or difference values. Alternatively, the user can enter and define any value using an interface, etc., for setting provided to the processing apparatus 1.

Proceeding to step 103, the process determines a feature quantity for each of the objects registered to the windows 11 and 12. The process determines feature quantities for intended typical objects representing the objects registered in the window 11 and feature quantities for unintended typical objects representing the objects registered in the window 12.

The typical object integrates a group of selected objects into a single object. Namely, the typical object is a virtual object representative of all the selected objects. The typical objects' feature quantities include not only a "weighted average value" for respective objects, but also the center value of feature quantities for respective objects and other feature quantities assigned to the entire group of selected objects based on the feature quantities for the selected objects. The term "unintended" has not only the negative meaning, but also the positively excluding meaning.

At step 103, the feature quantity decision section 5 determines each object's feature quantity. Each object's feature quantity is used in common with computation for constructing the feature quantity database 8. For example, the feature quantity database 8 may contain feature quantities for the objects stored in the windows 11 and 12. In this case, the feature quantities are read from the feature quantity database 8 for use instead of computing feature quantities. The intended typical object's feature quantity is a weighted average value of feature quantities for respective objects registered in the window 11. The unintended typical object's feature quantity is a weighted average value of feature quantities for respective objects registered in the window 12.

Figure 3:
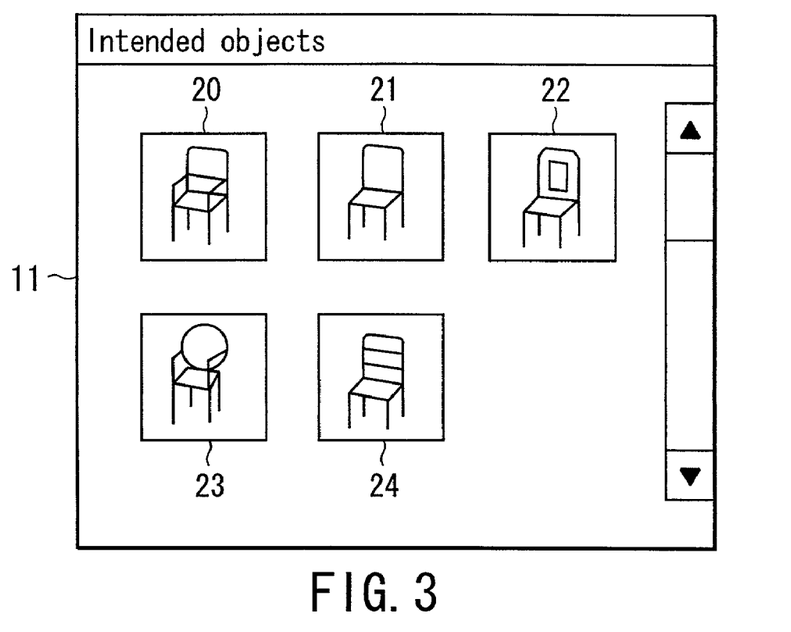
FIG. 3 shows a screen displaying registered intended objects.
Figure 4:
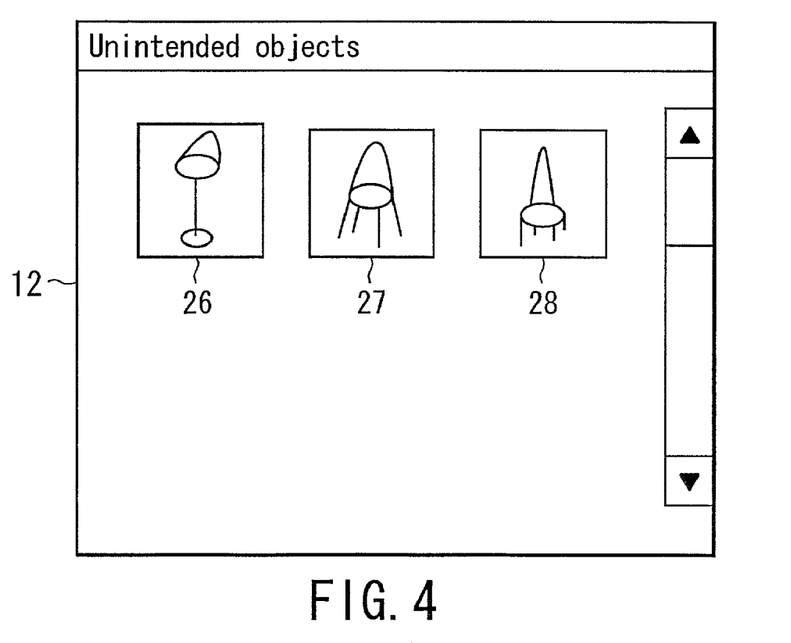
FIG. 4 shows a screen displaying registered unintended objects.

For example, let us examine a "height-direction size", one of feature quantities attributed to the objects 20 through 24 as shown in FIG. 3. Here, "height-direction sizes" of the objects 20 through 24 are assumed to be h20, h21, h22, h23, and h24, respectively. The objects' weighting factors are assumed to be wo20, wo21, wo22, wo23, and wo24, respectively. Then, average value hav for the "height-direction sizes" can be found from the following equation 1.

$$hav = (wo20*h20 + wo21*h21 + \ldots + wo24*h24)/(wo2 + wo21 + \ldots + wo24) \quad (1)$$

The average value hav is used as the feature quantity, i.e., "height-direction size" for the typical object representing the objects 20 through 24.

Then, let us examine a "shape complexity", one of feature quantities attributed to the objects 20 through 24. The "shape complexity" is found by dividing the object's surface area by the volume. Now, assume "shape complexities" for the objects 20 through 24 to be c20, c21, c22, c23, and c24, respectively. Then, average value cav of the "shape complexities" can be found from an equation similar to equation 1.

Figure 5:
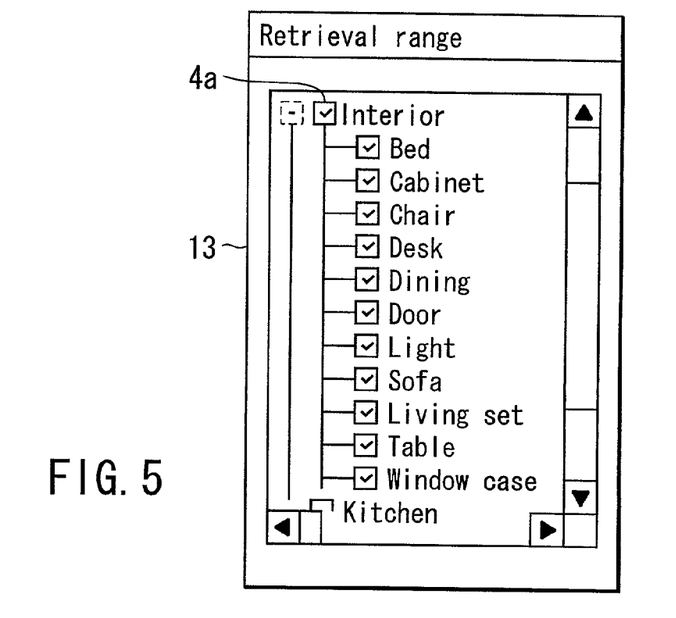
FIG. 5 shows a screen displaying a retrieval range of specified objects.
Figure 6:
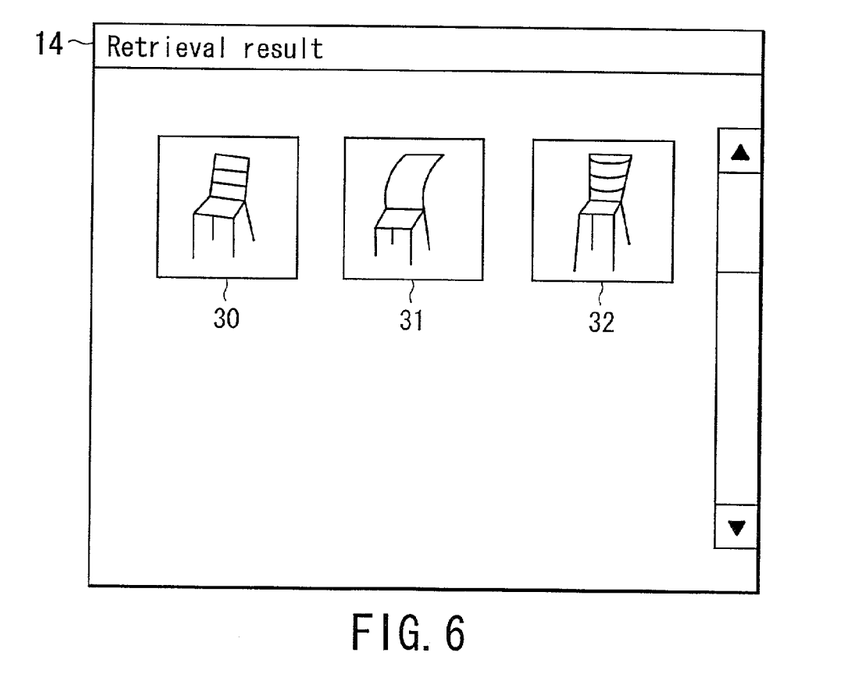
FIG. 6 shows a screen displaying retrieved objects.

At step 104, the retrieval range specification section 6 sets a retrieval range for specifying retrieval genres displayed on the window 13. The retrieval genres are categorized into chair, table, etc. When the retrieval is performed previously, the object included in the past retrieval result is categorized as an independent retrieval genre (not shown). The user can select one or more retrieval genres by enabling the corresponding check boxes.

Figure 9:
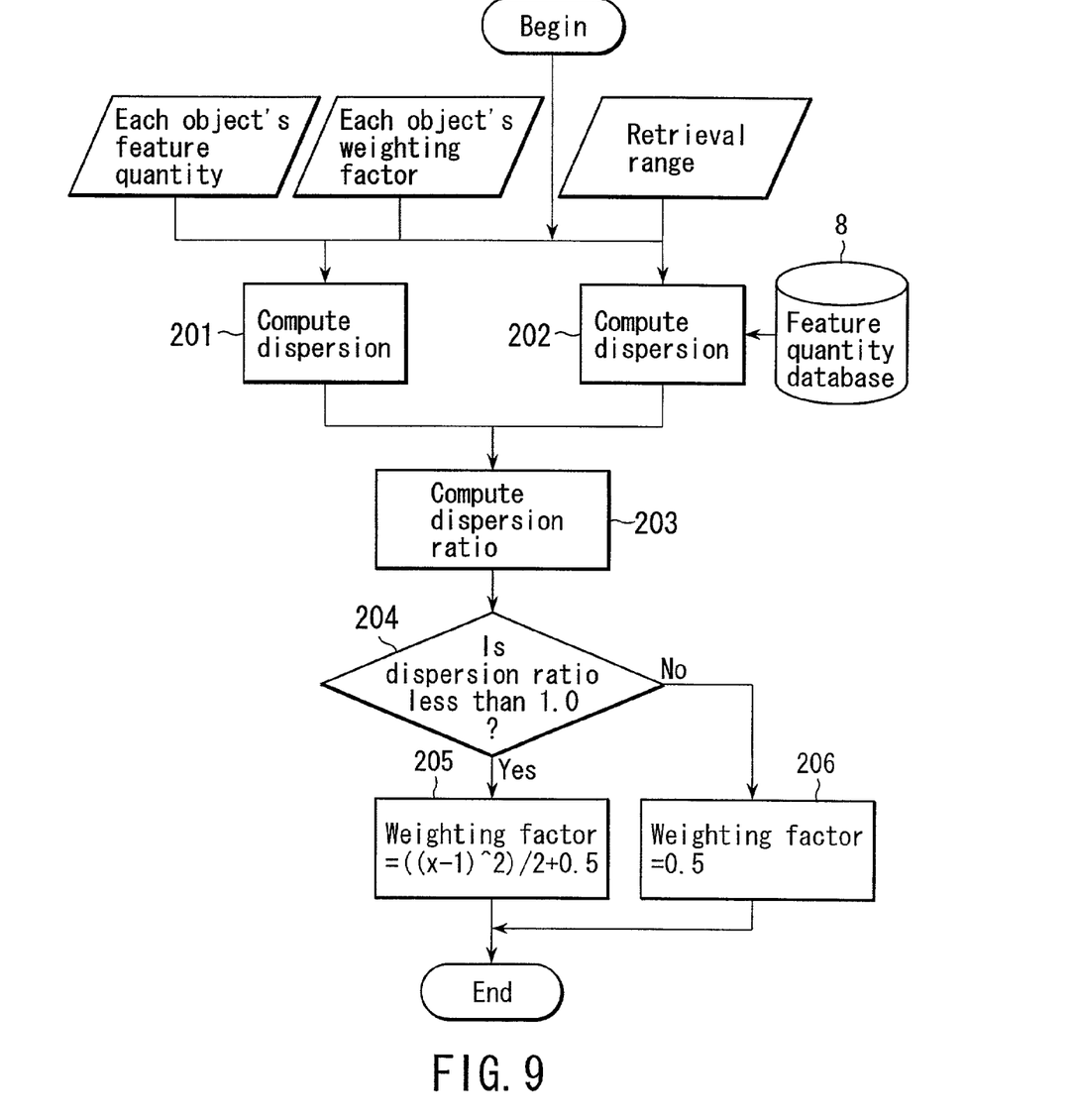
FIG. 9 is a flowchart showing the detail of a process at step 105 in FIG. 7.

At step 105, the weighting factor decision section 7 determines each feature quantity's weighting factor based on the feature quantities for the objects registered in the windows 11 and 12 at step 103 and the information stored in the feature quantity database 8. FIG. 9 shows in detail the process at step 105.

At step 201 as shown in FIG. 9, the process computes, e.g., dispersion values as the statistic of the feature quantities for the objects determined at step 103. For example, let us examine the "height-direction size", one of feature quantities attributed to the objects 20 through 24. Here, the "height-direction sizes" of the objects 20 through 24 are assumed to be h20, h21, h22, h28, and h24, respectively. The typical object's "height-direction size" is assumed to be hav. The respective objects' weighting factors are assumed to be wo20, wo21, wo22, wo23, and wo24, respectively. Then dispersion value hsd of the "height-direction sizes" can be found from the following equation 2.

$$hsd = (wo20*(h20-hav)^2 + wo21*(h21-hav)^2 + \ldots + wo24*(h24-hav)^2)/(wo20 + wo21 + \ldots + wo24) \quad (2)$$

The dispersion value hsd is used as the dispersion value associated with the "height-direction size" feature quantities for the objects 20 through 24. An equation similar to equation 2 can be used to find dispersion value csd for "shape complexity" attributed to the objects 20 through 24.

At step 202, a dispersion value is computed with respect to the feature quantities in the feature quantity database 8 corresponding to the objects included in the retrieval range determined at step 104. For example, the objects registered to the feature quantity database 8 are given feature quantities such as "height-direction size" and "shape complexity". An equation similar to equation 2 can be used to find dispersion value hdbsd of the "height-direction sizes" and dispersion value cdbsd of the "shape complexities".

At step 203, a dispersion ratio is computed by dividing the dispersion value found at step 201 by the dispersion value found at step 202. For example, dispersion value hsd of the "height-direction sizes" computed at step 201 is assumed to be 10.0. Dispersion value hdbsd computed at step 202 is assumed to be 200.0. In this case, dispersion ratio hsdr results in 10.0/200.0. As another example, dispersion value csd of the "shape complexities" computed at step 201 is assumed to be 0.6. Dispersion-value cdbsd computed at step 202 is assumed to be 0.5. In this case, dispersion ratio csdr results in 0.6/0.5.

At step 204, the process evaluates the dispersion ratio found at step 203. The dispersion ratio represents a degree of variance of feature quantities for the objects specified at step 101 against a degree of variance of feature quantities for the database objects included in the retrieval range.

When the dispersion ratio is 1, this is equivalent to a state in which objects are randomly specified in the windows 11 and 12. There is no emphasized feature quantity. When the feature quantity's dispersion ratio is smaller than 1, this means that the feature quantity is more homogeneous for the objects specified at step 101 than for the database objects. Namely, the user emphasizes similarity of this feature quantity. When the feature quantity's dispersion ratio is greater than 1, this means that the feature quantity for the objects specified at step 101 varies in the same degree as or more widely than for the database objects. Namely, the user does not emphasize similarity of this feature quantity. At step 203, the computation results in the dispersion ratio hsdr 0.05 for the "height-direction size" as one of feature quantities given to the objects 20 through 24. Namely, the user specifies objects having the well-balanced "height-direction size" in the window 11 and emphasizes similarity of this feature quantity.

At step 203, by contrast, the computation results in the dispersion ratio csdr 1.2 for the "shape complexity" as one of feature quantities given to the objects 20 through 24. Namely, in the window 11, the user specifies objects having "shape complexities" that vary almost in the same degree as for the objects registered in the database and does not emphasize similarity of this feature quantity.

When the dispersion ratio is determined to be smaller than 1 at step 204, the process proceeds to step 205 to set a weighting factor of each feature quantity according to the following formula 3.

$$f(x)=((sdr-1)^2)/2+0.5 \qquad (3)$$

For example, the dispersion ratio 0.05 is found for the "height-direction size", one of feature quantities given to the objects 20 through 24. Equation 3 yields weighting factor 0.95125 corresponding to the "height-direction size".

When the dispersion ratio is determined to be greater than or equal to 1 at step 204, the weighting factor for each feature quantity is set to 0.5 at step 206. For example, the dispersion ratio 1.2 is found for the "shape complexity", one of the feature quantities given to the objects 20 through 24. The weighting factor for the "shape complexity" becomes 0.5.

At step 106, the similarity is computed among the intended typical object, the unintended typical object, and the database-registered objects based on the feature quantities for the intended typical object and the unintended typical object determined at step 103, the weighting factor of each feature quantity determined at step 105, and the information stored in the feature quantity database 8. Further, the total similarity is computed from the similarity between the intended typical object and the database-registered objects and from the similarity between the unintended typical object and the database-registered objects.

Figure 10:
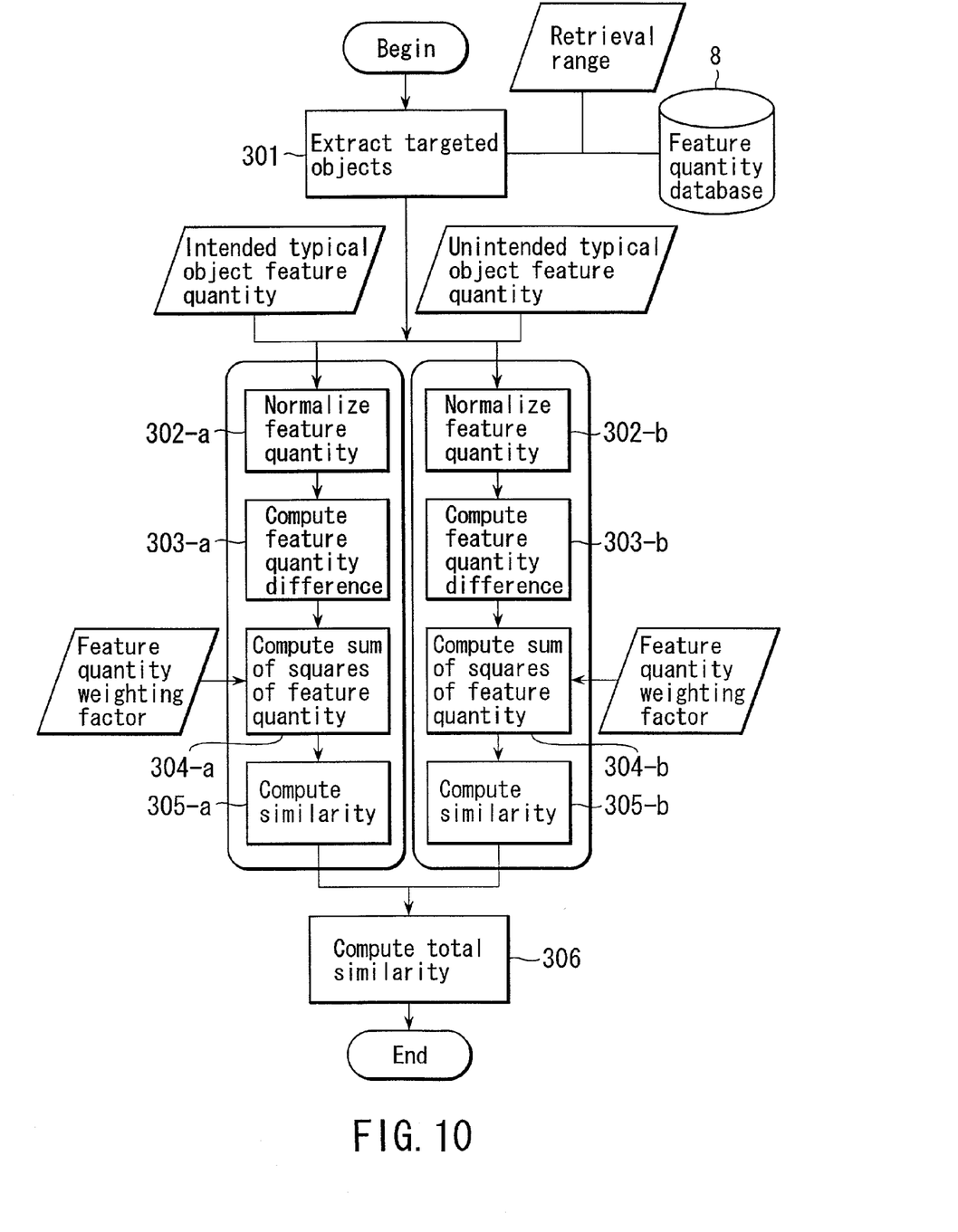
FIG. 10 is a flowchart showing the detail of a process at step 106 in FIG. 7.

At step 106, the retrieval section 9 retrieves similar objects. FIG. 10 shows the process at step 106 in detail.

At step 301, objects for retrieval are extracted from the retrieval range determined at step 104 and the feature quantity database 8. At and after steps 302a and 302b, the process computes the similarity between the typical object and the objects for retrieval. At step 302a, the process normalizes the feature quantities for the objects extracted from the feature quantity database 8 and those for the intended typical object. Normalization of feature quantities is needed because respective feature quantities use different units or scales and their original values cannot be simply compared to each other. For example, the same value 1 has different meanings for the "height-direction size" and the "shape complexity" which are feature quantities given to an object. Namely, it is impossible to handle the "height-direction size" with a difference of 1 and the "shape complexity" with a difference of 1 in the same manner. Accordingly, the feature quantities need to be normalized so as to adjust the scales therebetween.

The normalization is based on the standard deviation. First, there are computed the average value and the standard deviation of each feature quantity for a targeted object and an intended object. Then, as shown in equation 4 to follow, the average value is subtracted from each feature quantity for the targeted object and the intended object. The result is divided by the standard deviation.

$$f=(f\_org-f\_av)/f\_sd \qquad (4)$$

When the dispersion of feature quantities is normal, a value within three times of the standard deviation includes 99.7% of the feature quantities. When value f computed by equation 4 is greater than or equal to 3, f=3 is assumed. When value f is smaller than or equal to −3, f=−3 is assumed.

According to the above-mentioned procedure, the scale is normalized to ±3. At step 303a, the procedure computes a difference between the feature quantity for the targeted object and the feature quantity for the intended typical object.

At step 304a, the process computes a sum of squares of the feature quantity vector, assuming that a feature quantity is a vector component. At this time, a feature quantity vector component is multiplied by the feature quantity weighting factor determined at step 105. For example, let us consider "height-direction size" and "shape complexity" which are feature quantities given to the objects 20 through 24. The weighting factor for "height-direction size" is 0.95125. The weighting factor for "shape complexity" is 0.5. The calculation at step 304a multiplies the feature quantity weighting factor. For this reason, a sum of squares of the feature quantity vector is computed assuming that the "height-direction size" is 0.95125 and the "shape complexity" is 0.5 even if there is the same difference of 1 for both of these feature quantities. Namely, the magnitude of a value varies with the weighting factor if feature quantity differences show the same value. The feature quantity with a small weighting factor has a small effect on a sum of squares of the feature quantity vector.

At step 305a, the following equation 5 is used to find the similarity from the feature quantity vector's sum of squares vLength found at step 304a.

$$\text{Similarity}=exp\,(-1*\text{vLength}) \qquad (5)$$

When the targeted object includes an object having a feature quantity which completely matches the intended typical object, the feature quantity vector's sum of squares vLength found at step 304a becomes 0. Equation 5 yields the similarity of 1.

When the object has a feature quantity which largely differs from the intended typical object, the feature quantity vector's sum of squares vLength found at step 304a becomes larger. The similarity found by equation 5 approximates to 0.

The process from steps 302a to 305a for the intended typical object is performed for the unintended typical object from steps from 302b to 305b. At step 305b, the process computes the similarity for the unintended object. When the targeted object includes an object having a feature quantity which completely matches the unintended typical object, the feature quantity vector's sum of squares vLength found at step 304b becomes 0. Equation 5 yields the similarity of 1.

When the object has a feature quantity which largely differs from the unintended typical object, the feature quantity vector's sum of squares vLength found at step 304b becomes larger. The similarity found by equation 5 approximates to 0.

At step 306, the total similarity is computed from the similarity (similarity_a) found at step 305a for intended objects and the similarity (similarity_b) found at step 305b for unintended objects. As shown in equation 6, the total similarity represents a quantity which is similar to intended objects and is not similar to unintended objects.

$$total\_similarity = similarity\_a / similarity\_b \quad (6)$$

At step 107 in FIG. 8, objects are read from the source object database 10 based on the result of the similarity retrieval performed at step 106. The objects are displayed in the window 14 in the order of total similarities. The user can register the objects displayed in the window 14 to the windows 11 and 12 for re-retrieval.

The feature quantity database 8 and the source object database 10 may be not only networked, but also arranged inside the processing apparatus 1. The user may define some object weighting factors at step 102. The weighting factor decision section 7 may automatically configure the remaining weighting factors not defined by the user. The normalization of feature quantities at steps 302*a* and 302*b* is not limited to the above-mentioned technique. That technique can be replaced by a well-known method such as the normalization technique using the maximum value of 1. The multimedia object is not limited to a 3-D object, but may be a motion picture. When layered in the time direction, the motion picture provides information equivalent to 3-D volume data. The multimedia object may be music data. Fourier-transforming the music data provides a feature quantity in the frequency domain. A variation of the amplitude in the time domain etc. can be used as a feature quantity. Further, it is possible to compute a feature quantity from an image or a video generate by the graphic equalizer or other tools for visualizing music data.

The embodiment according to the present invention uses "dispersion" for the statistic. It is also possible to use the statistic indicating "distribution" of feature quantities such as the standard deviation, the minimum or maximum range, etc.

By using the embodiment according to the present invention, a dispersion ratio is computed at step 105 for each feature quantity determined at step 103. A large weighting factor is automatically determined for the feature quantity having the small dispersion ratio. A small weighting factor is automatically determined for the feature quantity having the large dispersion ratio. As a result, without understanding the meaning of each feature quantity, the user can define a large weighting factor for the emphasized feature quantity and a small weighting factor for the unemphasized feature quantity. This makes it possible to display a more appropriate retrieval result.

At step 105, a dispersion value is computed for each feature quantity according to the retrieval range determined at step 104. The feature quantity weighting factor is determined based on the ratio between objects registered to the windows 11 and 12 and objects registered to the feature quantity database 8. It is needless to previously normalize feature quantities processed in the system according to the present invention. As a result, a user can use the system to register to the windows 11 and 12 an object not contained in the database and perform the similarity retrieval.

In addition, the user can use the windows 11 and 12 to register objects in the window 14 for displaying a retrieval result and re-retrieve the objects. This operation makes it possible to repetitively narrow the range of intended and unintended objects and effectively specify the emphasized and unemphasized feature quantities.

Regarding respective feature quantities, a comparison is made between the statistic for a group of selected feature quantities and the statistic for the retrieval range. All feature quantities need not be normalized each time the retrieval range is changed.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An object retrieval method comprising:
   a first step of selecting a plurality of objects from displayed objects;
   a second step of obtaining dispersions of the selected plurality of the objects with respect to a plurality of different types of feature quantities;
   a third step of obtaining dispersions of a plurality of objects in a range from which a plurality of objects are selected with respect to the plurality of different types of feature quantities;
   a fourth step of comparing the dispersions obtained in the second step with the dispersions obtained in the third step for each of the plurality of different types of feature quantities;
   a fifth step of weighting each of the plurality of the different types of feature quantities through a quantitative calculation using the dispersions obtained in the second step and the dispersions obtained in the third step so that, a weight given to a feature quantity which dispersion obtained in the second step is more converged than the corresponding dispersion obtained in the third step is larger than a weight given to a feature quantity which dispersion obtained in the second step is not more converged than the corresponding dispersion obtained in the third step; and
   a sixth step of retrieving objects in the range of object retrieval by using the plurality of the different types of features weighted in the fifth step.

2. An object retrieval method according to claim 1, wherein the first step of selecting objects selects objects similar to those selected as a retrieval result.

3. An object retrieval method according to claim 1, wherein the first step of selecting objects selects different type of objects to those selected as a retrieval result.

4. An object retrieval method according to claim 1, wherein the first step of selecting objects selects both objects similar to those selected as a retrieval result and different type of objects to those selected as a retrieval result.

5. An object retrieval method according to claim 1, wherein the second step further comprises the steps of:
   weighting each of a plurality of the selected objects;
   finding a feature quantity for a plurality of the objects with respect to each of a plurality of the different types of feature quantities; and
   obtaining a dispersion of a plurality of the objects by reflecting weighting for a plurality of the objects with respect to each of a plurality of the different types of feature quantities.

6. An object retrieval method according to claim 1, wherein
   the first step selects a plurality of the objects according to priorities; and
   the second step weights the objects selected according to priorities.

7. An object retrieval method according to claim 1, wherein
the fourth step compares dispersions by using a dispersion value as a dispersion between a plurality of the objects.

8. An object retrieval method according to claim 1, wherein
the fourth step compares dispersions by using standard deviation as a dispersion between a plurality of the objects.

9. An object retrieval method according to claim 1, wherein
the first step selects a plurality of objects out of those previously registered to a database.

10. An object retrieval method according to claim 1, wherein
a database previously registers feature quantities for objects used for the second and third steps.

11. An object retrieval apparatus comprising:
an object selection apparatus which displays a plurality of objects and supplies objects to be selected from a plurality of the displayed objects;
a first dispersion processing apparatus which finds a dispersion of a plurality of the objects selected by the object selection apparatus with respect to each of a plurality of the different types of feature quantities;
a second dispersion processing apparatus which finds a dispersion of a plurality of the objects in the range from which a plurality of objects are selected with respect to each of a plurality of the different types of feature quantities;
a dispersion comparison apparatus which compares a dispersion of a plurality of the different types of feature quantities found by the first dispersion processing apparatus with a dispersion of a plurality of the different types of feature quantities found by the second dispersion processing apparatus;
a weighting apparatus which weights feature quantities through a quantitative calculation using the dispersions obtained in the first dispersion processing apparatus and the dispersions obtained in the second dispersion processing apparatus so that when the dispersion of the selected objects is determined to be more converged than the dispersion of objects in the range of object retrieval based on dispersions compared by the dispersion comparison apparatus, the dispersion of the selected objects is provided with a weight larger than any other feature quantities' weights;
a retrieval apparatus which retrieves objects in the range of object retrieval by using feature quantities weighted by the weighting apparatus.

12. An object retrieval apparatus according to claim 11, wherein the object selection apparatus comprises:
a display apparatus which displays an object; and
an input apparatus which selects and inputs objects similar to those selected as a retrieval result from a plurality of the displayed objects.

13. An object retrieval apparatus according to claim 11, wherein the object selection apparatus comprises:
a display apparatus which displays a plurality of objects; and
an input apparatus which selects and inputs different type of objects to those selected as a retrieval result from a plurality of displayed the objects.

14. An object retrieval apparatus according to claim 11, wherein the object selection apparatus comprises:
a display apparatus which displays a plurality of objects; and
an input apparatus which selects and inputs objects similar to those selected as a retrieval result and different type of objects to those selected as a retrieval result from a plurality of displayed the objects.

15. An object retrieval apparatus according to claim 11, wherein
the first dispersion processing apparatus comprises:
an apparatus which weights each of a plurality of the selected objects;
an apparatus which finds feature quantities for a plurality of the objects with respect to a plurality of the different types of feature quantities; and
an apparatus which obtains a dispersion of the objects by reflecting weighting for a plurality of the objects with respect to a plurality of the different types of feature quantities.

16. An object retrieval means comprising:
an object selection means for displaying a plurality of objects and supplying objects to be selected from a plurality of the displayed objects;
a first dispersion processing means for finding a dispersion of a plurality of the objects selected by the object selection means with regard to each of a plurality of different types of feature quantities;
a second dispersion processing means for finding a dispersion of objects in the range from which a plurality of objects are selected with regard to each of a plurality of the different types of feature quantities;
a dispersion comparison means for comparing a dispersion of a plurality of the different types of feature quantities found by the first dispersion processing means with a dispersion of a plurality of the different types of feature quantities found by the second dispersion processing means;
a weighting means for weighting feature quantities through a quantitative calculation using the dispersions obtained in the first dispersion processing means and the dispersions obtained in the second dispersion processing means so that when the dispersion of selected objects is determined to be more converged than the dispersion of objects in the range of object retrieval based on dispersions compared by the dispersion comparison means, the dispersion of selected objects is provided with a weight larger than any other feature quantities' weights; and
a retrieval means for retrieving objects in the range of object retrieval by using feature quantities weighted by the weighting means.

17. An object retrieval means according to claim 16, wherein the object selection means comprises:
a display means for displaying objects; and
an input means for selecting and inputting objects similar to those selected as a retrieval result from a plurality of the displayed objects.

18. An object retrieval means according to claim 16, wherein the object selection means comprises:
a display means for displaying a plurality of objects; and
an input means for selecting and inputting different type of objects to those selected as a retrieval result from a plurality of displayed the objects.

19. An object retrieval means according to claim 16, wherein the object selection means comprises:
a display means for displaying a plurality of objects; and
an input means for selecting and inputting objects similar to those selected as a retrieval result and different type of objects to those selected as a retrieval result from a plurality of the displayed objects.

20. An object retrieval means according to claim 16, wherein the first dispersion processing means comprises:
- a means of weighting each of a plurality of the selected objects;
- a means of finding feature quantities for a plurality of the objects with respect to a plurality of the different types of feature quantities; and
- a means of obtaining dispersion of the objects by reflecting weighting for a plurality of the objects with respect to a plurality of the different types of feature quantities.

* * * * *